May 4, 1948. A. E. SCHUBERT ET AL 2,441,104
LENS MOUNT LOCKING RING
Filed Aug. 8, 1945
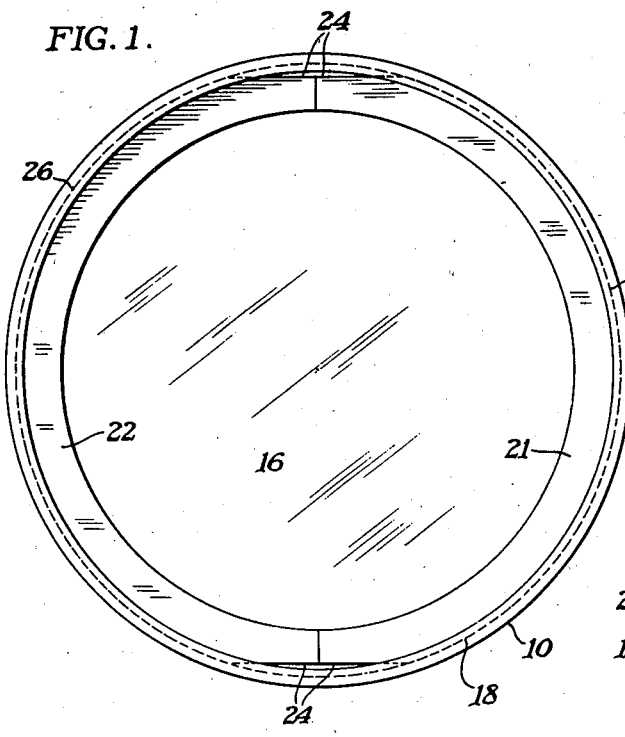
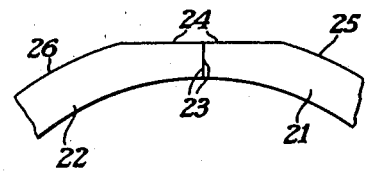
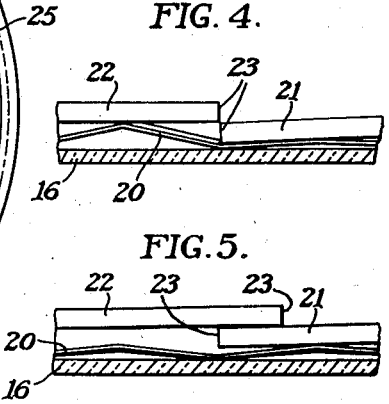
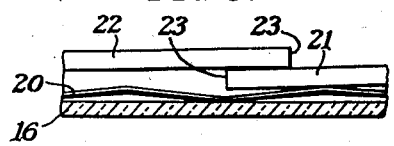
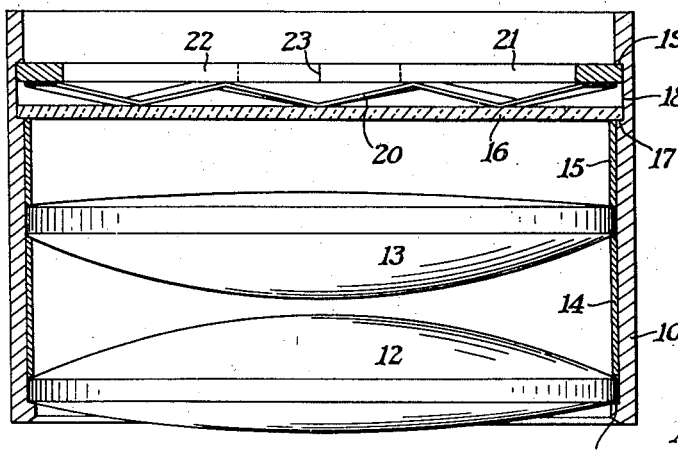
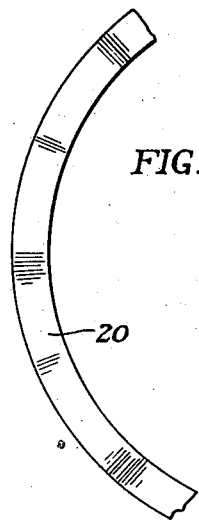
ALVIN E. SCHUBERT
GEORGE W. SCHNETZER, JR.
INVENTORS
BY
ATTORNEYS Patented May 4, 1948

2,441,104

UNITED STATES PATENT OFFICE 2,441,104

LENS MOUNT LOCKING RING

Alvin E. Schubert and George W. Schnetzer, Jr., Rochester, N. Y., assignors to Eastman Kodak Company, Rochester, N. Y., a corporation of New Jersey Application August 8, 1945, Serial No. 609,664

6 Claims. (Cl. 88—57)

The present invention relates to a lens barrel, or lens mount, and more particularly to a locking ring for use in connection therewith.

The invention has as its principal object the provision of a locking ring which is sturdy, easy to assemble, and which effectively retains the lens elements in position in the lens barrel.

A further object of the invention is the provision of a locking ring which is formed of two identical semi-annular parts which may be readily mounted in or removed from locking position in the lens barrel.

Yet another object of the invention is the provision of a locking ring which is simple in construction and inexpensive to manufacture.

To these and other ends, the invention relates to certain improvements and combinations of parts, all as will be hereinafter more fully described, the novel features being pointed out in the claims at the end of the specification.

In the drawings:

Fig. 1 is an end view of the lens mount showing the relation thereto of a locking ring constructed in accordance with the preferred embodiment of the present invention;

Fig. 2 is a longitudinal sectional view through the lens mount, illustrated in Fig. 1, showing the relation of the parts;

Fig. 3 is a partial plan view of the locking ring showing the relation of the two parts which constitute the ring, and the outer cutaway portions of reduced diameter;

Fig. 4 is a partial longitudinal sectional view through the barrel illustrated in Fig. 2, and showing the manner of relatively moving the ring members to disengage them;

Fig. 5 is a view similar to Fig. 4, but showing the ring members partially slid over each other to permit removal of the ring from the slot in the lens barrel; and Fig. 6 is a plan view of a portion of the bowed annular spring which maintains the ring parts in assembled relation in a slot in the lens barrel.

Similar reference numerals throughout the various views indicate the same parts.

The present invention relates to a lens mount comprising a tubular lens barrel 10 formed, adjacent one end thereof, with an inwardly extending shoulder or ledge 11 adapted to receive the peripheral edge of a lens element 12. A second lens element 13 is positioned above the lens 12 and is maintained in proper spaced relation relative thereto by means of a cylindrical spacing member 14. A second spacer 15 is supported on the lens 13. The upper end of the barrel 10, as viewed in Fig. 2, is provided with a circumferential slot 18 on the lower edge 17 of which a disk member, in the form of a heat resisting glass 16, rests.

The upper edge 19 of the slot 18 is spaced from the lower edge 17 a distance sufficient to receive an annular bowed string 20 and a locking ring constructed in accordance with the present invention. This locking ring is formed from a pair of identically shaped semi-annular members 21 and 22, the ends 23 of which are adapted, when assembled, as shown in Fig. 2, to be arranged in abutting relation to retain the parts 21 and 22 in a plane to form a single continuous ring, as shown in Figs. 1 and 2. The outer surfaces 24 of the portions of the members 21 and 22 adjacent the end 23 are cut away to a diameter less than the inner diameter of the barrel 10 and slot 18. Thus, the surfaces 24 will be spaced inwardly from the inner surface of the barrel, as best shown in Fig. 1. The outer edges 25 and 26 of the members 21 and 22 on the other hand, have for the greater portion of their length a radius of curvature greater than that of the inner surface of the barrel and substantially equal to the outer periphery of the slot 18, as best shown in Fig. 2. Thus when the ring parts are in assembled relation, the outer surfaces 25 and 26 of the members 21 and 22 will be positioned completely within the slot 18, as shown in Fig. 2, while the edge portion 24 will lie within the lens barrel opening, as shown in Fig. 1.

When the locking ring has been positioned in the lens barrel, the spring 20 is first inserted in the slot 18 and supported by the heat resisting glass disk 16. One of the ring members, say the member 21, is slid laterally to bring the outer edge 25 thereof into position within the slot 18 between the spring 20 and the upper edge 19. The other member 22 is then slid between the spring 20 and the edge 19 to position its outer edge 26 in the slot 18. The adjacent edges 23 are then in axial but not transverse alignment. Then by pressing the uppermost end 23 downwardly it is brought into registry with corresponding end 23 of the other member. The edges are then arranged in alignment and in abutting relation, as shown in Fig. 2. The ring is now in assembled relation with the outer edge portions 25 and 26 positioned within the slot 18 and the cutaway edges 24 spaced from the inner surface of the barrel 10, as shown in Fig. 1. The spring 20 serves to hold the ring members 21 and 22 in a plane and in assembled relation to retain the lens elements 12 and 13, and the spacers 14 and 15, and the glass disk 16, in proper assembled relation in the barrel 10.

If, for any reason, the ring is to be removed, such removal may be accomplished readily and easily. To secure this result, the end portion of one of the ring members, say the right-hand member 21, shown in Fig. 5, is pressed downwardly against the action of the spring 20 to move the ends 23 out of abutting relation, as shown in Fig. 5. Then by inserting the fingernail or other thin member between the outer edge 24 of the uppermost member and the inner edge of the lens barrel, the uppermost member 22 may be slid over the lower member 21 to withdraw the member 22 from the slot 18. The member 21 may then be slid to the left and lifted out of the slot.

The split locking ring is thus pressed at a number of points by the bowed annular spring 20 and is yieldably held against the edge 19 of slot 18. The flat or cutaway outer edges 24 of the ring members permit ready assembling and removal of the ring parts, and the thickness of the ring is great enough to require considerable depression of the spring 20 before the ends 23 may be moved out of their abutting relation to unlock the ring parts.

It is thus apparent that the above-described locking ring construction enables the ready and easy assembling or disengagement of the ring parts, and when the ring is in the assembled relation it retains the various parts in assembled relation in the lens barrel. Yet, the locking ring can be readily unlocked to permit the removal of the various lens members for cleaning and/or replacement.

While one embodiment of the invention has been described, it is to be understood that the inventive idea may be carried out in a number of ways. This application is, therefore, not to be limited to the precise details described, but is intended to cover all variations and modifications thereof falling within the scope of the appended claims.

We claim:

1. In a mount, the combination with a tubular barrel formed with an internal circumferential slot, elements positioned within said barrel, of a locking ring positionable in said slot to retain said elements in position in said barrel, said ring having an outer diameter greater than the inner diameter of said barrel and being diametrically split to form two identical semi-annular members each of which is formed with diametrically arranged cut away portions adjacent said split so that the ring adjacent said split will have a diameter less than the inner diameter of said barrel to permit the insertion of said parts in said slot.

2. In a mount, the combination with a tubular barrel formed with an internal circumferential slot, elements positioned in axial spaced relation in said barrel, of a locking ring adapted to be inserted in said slot to retain said elements in position in said barrel, said ring comprising a pair of semi-annular parts the outer edges of which for the greater portion of their lengths having a radius of curvature greater than the inner surface of said barrel, and end portions on said parts adapted to be arranged in cooperating abutting relation to retain said ring in a plane and in said slot, said end portions having the outer edges thereof cut-away to a diameter less than the inner surface of said barrel to permit the insertion of said parts in cooperating relation in said slot, and yieldable means positioned in said slot and engaging said ring to retain the latter in said slot.

3. In a mount, the combination with a tubular barrel formed with an internal circumferential slot, elements positioned within said barrel, of a locking ring positionable in said slot to retain said elements in position in said barrel, said ring having an outer diameter greater than the inner diameter of said barrel and being diametrically split to form two identical semi-annular members each of which is formed with diametrically arranged cut-away portions adjacent said split so that the ring adjacent said split will have a diameter less than the inner diameter of said barrel to permit the insertion of said parts in said slot, and yieldable means positioned in said slot and engaging said ring to retain the latter in said slot.

4. In a mount, the combination with a tubular barrel formed with an internal circumferential slot, elements positioned in axial spaced relation in said barrel, of a locking ring adapted to be inserted in said slot to retain said elements in position in said barrel, said ring comprising a pair of semi-annular parts the outer edges of which for the greater portion of their lengths having a radius of curvature greater than the inner surface of said barrel, end portions on said parts adapted to be arranged in cooperating abutting relation to retain said ring in a plane and in said slot, said end portions having the outer edges thereof cut-away to a diameter less than the inner surface of said barrel to permit the insertion of said parts in cooperating relation in said slot, and a bowed annular spring member positioned in said slot and engaging said parts to retain the latter in a plane in said slot, said ends being adapted to be relatively movable axial against the action of said spring to move said portions out of alignment to permit removal of said parts from said slot.

5. In a lens mount, the combination with a tubular lens barrel formed with an internal circumferential slot adjacent an end thereof, lens elements positioned in spaced relation in said barrel, tubular spacers positioned between said elements to retain the axial relation thereof, a disk member positioned in said slot and engaging one edge thereof, of a locking ring positionable in said slot and engageable with another edge thereof and cooperating with said disk member to retain said lens elements and spacers in proper axial relation in said barrel, said ring being formed from a pair of semi-annular members the outer surfaces of which have a diameter greater than the inner diameter of said slot, end portions on said members adapted to be engaged in abutting relation to retain said member in a plane in said slot to form a complete ring, said portions having the outer surfaces thereof cut away to a diameter less than the inner diameter of said slot to permit the insertion of said semi-annular members there into, and yieldable means positioned between said disk member and said ring to retain the latter in a plane and against the other edge of said slot.

6. In a lens mount, the combination with a tubular lens barrel formed with an internal circumferential slot adjacent an end thereof, lens elements positioned in spaced relation in said barrel, tubular spacers positioned between said elements to retain the axial relation thereof, a disk member positioned in said slot and engaging one edge thereof, of a locking ring positionable in said slot and engageable with another edge thereof and cooperating with said disk member to retain said lens elements and spacers in proper axial relation in said barrel, said ring being formed from a pair of semi-annular members the outer surfaces of which have a diameter greater than the inner diameter of said slot, end portions on said members adapted to be engaged in abutting relation to retain said member in a plane in said slot to form a complete ring, said portions having the outer surfaces thereof cut-away to a diameter less than the inner diameter of said slot to permit the insertion of said semi-annular members thereinto, and a bowed annular spring member positioned in said slot between said disk member and said semi-annular members to yieldably retain the latter in engagement with the other edge of said slot, said end portions being relatively movable axial against the action of said spring to move said portions out of abutting relation to permit the removal of said semi-annular ring members from said slot.

ALVIN E. SCHUBERT.
GEORGE W. SCHNETZER, Jr.

REFERENCES CITED

The following references are of record in the file of this patent:

UNITED STATES PATENTS

| Number | Name | Date |
|---|---|---|
| 590,798 | Wagner | Sept. 28, 1897 |
| 1,151,008 | Guthrie et al. | Aug. 24, 1915 |
| 1,258,621 | Jenkins | Mar. 5, 1918 |
| 1,848,253 | Howell | Mar. 8, 1932 |
| 1,900,020 | McCandless | Mar. 7, 1933 |
| 2,083,600 | Gubisch | June 15, 1937 |
| 2,195,184 | Mobary | Mar. 26, 1940 |
| 2,377,056 | Tonrup | May 29, 1945 |